US009813776B2

(12) United States Patent
Garcia

(10) Patent No.: US 9,813,776 B2
(45) Date of Patent: Nov. 7, 2017

(54) SECONDARY SOUNDTRACK DELIVERY

(75) Inventor: Roberto Garcia, St. Louis, MO (US)

(73) Assignee: PIN PON LLC, St. Louis, MO (US)

( * ) Notice: Subject to any disclaimer, the term of this patent is extended or adjusted under 35 U.S.C. 154(b) by 486 days.

(21) Appl. No.: 13/532,089

(22) Filed: Jun. 25, 2012

(65) Prior Publication Data

US 2013/0345841 A1 Dec. 26, 2013

(51) Int. Cl.
*G06F 17/00* (2006.01)
*H04N 21/658* (2011.01)
*H04N 21/6377* (2011.01)
*H04N 21/81* (2011.01)
*H04N 21/8352* (2011.01)
*H04N 21/845* (2011.01)

(52) U.S. Cl.
CPC ..... *H04N 21/6581* (2013.01); *H04N 21/6377* (2013.01); *H04N 21/8106* (2013.01); *H04N 21/8352* (2013.01); *H04N 21/8455* (2013.01)

(58) Field of Classification Search
CPC .......... H04N 21/8106; H04N 21/6581; H04N 5/607; H04N 21/4856; H04N 21/4305
See application file for complete search history.

(56) References Cited

U.S. PATENT DOCUMENTS

| 4,882,681 | A | 11/1989 | Brotz |
| 5,844,824 | A | 12/1998 | Newman et al. |
| 5,946,376 | A | 8/1999 | Cistulli |
| 6,262,889 | B1 | 7/2001 | Newman et al. |
| 6,304,459 | B1 | 10/2001 | Toyosato et al. |
| 6,359,777 | B1 | 3/2002 | Newman et al. |
| 6,407,673 | B1 | 6/2002 | Lane |
| D461,471 | S | 8/2002 | Newman et al. |
| 6,583,982 | B2 | 6/2003 | Mancini et al. |
| 6,757,551 | B2 | 6/2004 | Newman et al. |
| 7,272,377 | B2 | 9/2007 | Cox et al. |
| 7,689,245 | B2 | 3/2010 | Cox et al. |
| 2004/0139482 | A1* | 7/2004 | Hale et al. ..................... 725/135 |
| 2005/0113113 | A1 | 5/2005 | Reed |
| 2006/0285677 | A1* | 12/2006 | Souma ................ H04M 1/6058 379/388.03 |
| 2007/0207793 | A1 | 9/2007 | Myer et al. |
| 2008/0119236 | A1 | 5/2008 | Chen et al. |
| 2008/0261572 | A1 | 10/2008 | Tsui et al. |
| 2009/0298417 | A1 | 12/2009 | Phillips |
| 2010/0106482 | A1* | 4/2010 | Hardacker et al. ............... 704/3 |
| 2010/0299150 | A1 | 11/2010 | Fein et al. |
| 2011/0063503 | A1* | 3/2011 | Brand et al. .................. 348/500 |
| 2013/0070152 | A1* | 3/2013 | Berkowitz et al. ........... 348/500 |
| 2013/0272672 | A1* | 10/2013 | Padro Rondon et al. .... 386/201 |

FOREIGN PATENT DOCUMENTS

EP        1185138 A2    3/2002

* cited by examiner

*Primary Examiner* — Thomas Maung
(74) *Attorney, Agent, or Firm* — Armstrong Teasdale LLP

(57) ABSTRACT

Methods and systems for providing a secondary soundtrack to a user viewing an audiovisual work associated with a primary soundtrack. A secondary soundtrack corresponding to the primary soundtrack is determined. Soundtrack synchronization data from a user computing device is transmitted to a server, which determines a position within the primary soundtrack based on the soundtrack synchronization data. The selected secondary soundtrack is streamed to the client computing device based on the determined position, and played for a user of the client computing device.

19 Claims, 4 Drawing Sheets

SECONDARY SOUNDTRACK DELIVERY

BACKGROUND OF THE INVENTION

Audiovisual works, such as movies, include video accompanied by a soundtrack. A video may be associated with multiple soundtracks, such that the video can be displayed with different soundtracks in different regions and/or contexts. Further, some methods enable a viewer to select from multiple soundtracks when viewing an audiovisual work in a private or personal setting. For example, DVDs may be encoded with multiple soundtracks, and television broadcasts may include an alternate soundtrack using a second audio program (SAP) scheme.

In contrast, when a video is shown to an audience, such as in a movie theater, one soundtrack must be selected and played. For example, an English soundtrack may be played when a movie is shown to a predominantly English-speaking audience, whereas a Spanish soundtrack may be played when the movie is shown to a predominantly Spanish-speaking audience. However, an audience may not be homogeneous, and audience members who do not understand the language of the soundtrack played may have difficulty understanding the content of the video. Further, while supplemental audio content (e.g., commentary) may be of interest to some, playing such content to an entire audience may be undesirable.

In addition, even in the context of private viewing, existing schemes such as SAP may be limited by the quantity of secondary soundtracks that can be provided. For example, such schemes may enable a soundtrack to be broadcast in two languages, but may not support transmitting the soundtrack in a third language or transmitting a supplemental (e.g., commentary) soundtrack in addition to the two languages. Moreover, existing schemes for providing secondary soundtracks may enable such soundtracks to be provided only a publisher or broadcaster of an audiovisual work, such that listening to a secondary soundtrack from a third party may require the viewer to manually synchronize the desired soundtrack with the audiovisual work.

BRIEF DESCRIPTION OF THE INVENTION

Embodiments described herein enable a viewer of a video to select and listen to a secondary soundtrack associated with the video. In exemplary embodiments, when a primary soundtrack associated with the video is played, a user computing device, operated by the viewer, determines a secondary soundtrack that corresponds to the primary soundtrack. For example, the user computing device may receive a selection of the primary soundtrack from the viewer and/or may determine the primary soundtrack based on an audio sample received while the primary soundtrack is played, such as is possible by submitting the sample, or an acoustic fingerprint thereof, to a server and receiving the identification of the primary soundtrack in response.

The user computing device also receives a synchronization sample of the primary soundtrack via a microphone, and, in response, determines a position within the primary soundtrack based on the synchronization sample. The user computing device plays the secondary soundtrack based on the determined position within the primary soundtrack. For example, the user computing device may play the secondary soundtrack at a corresponding position through a personal listening device, such as a pair of headphones.

This summary introduces concepts that are described in more detail below. This summary is not intended to identify essential features, nor to limit in any way the scope of the claimed subject matter.

DETAILED DESCRIPTION OF THE INVENTION

Exemplary embodiments provide playback of one or more secondary (e.g., alternative and/or supplementary) soundtracks corresponding to a video that is associated with a primary soundtrack. Accordingly, different soundtracks may be provided to different audience members attending a single showing of the video.

Figure 1:
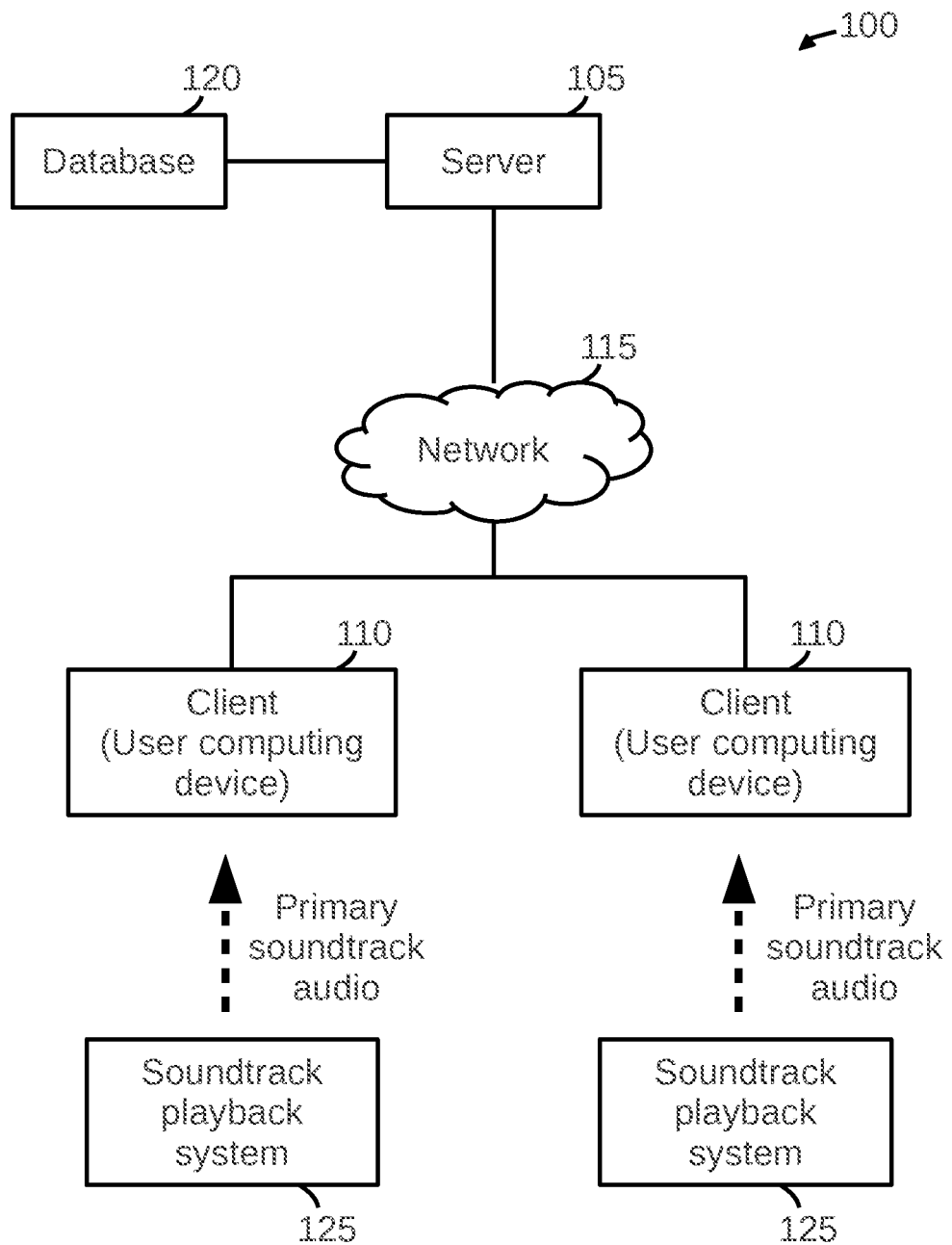
FIG. 1 is a block diagram of a system for use in providing soundtracks to user computing devices.

FIG. 1 is a block diagram of an exemplary system 100 for use in providing soundtracks from a server computing device 105 to user computing devices 110. In exemplary embodiments, server computing device, or "server," 105 and user computing devices, or "clients," 110 are computing devices that may be programmed to perform one or more operations described herein. Exemplary computing devices are described below with reference to FIG. 4.

In exemplary embodiments, server 105 communicates with clients 110 via a network 115, which may include the Internet, a local area network (LAN), a wide area network (WAN), a wireless LAN (WLAN), a cellular network (e.g., 3G and/or 4G), and/or any other communication medium that enables server 105 and clients 110 to exchange data as described herein. Server 105 may also exchange data with a database 120. For example, server 105 may store information in and/or retrieve data from database 120. In some embodiments, database 120 is executed by server 105. In other embodiments, database 120 is provided by another server 105 (not shown).

In exemplary embodiments, database 120 stores soundtracks (e.g., encoded audio) and/or soundtrack metadata, such as soundtrack identifiers, soundtrack languages, soundtrack types (e.g., commentary, critique, child-appropriate, and/or parody), soundtrack descriptions, soundtrack icons, soundtrack creators (e.g., studio identifiers and/or user identifiers), ratings (e.g., user-provided numeric scores), locations at which a soundtrack is being played, and/or associations between soundtracks, as described in more detail below. Soundtrack identifiers may include, for example, unique numeric and/or alphanumeric values (e.g., serial numbers), titles, and/or names. Database 120 may also store one or more acoustic fingerprints associated with each soundtrack. In exemplary embodiments, within database 120, each soundtrack is associated with a plurality of acoustic fingerprints, and each acoustic fingerprint corresponds to a position within the soundtrack (e.g., a time or quantity of audio frames relative to the beginning of the soundtrack).

System 100 enables one or more secondary soundtracks to be provided to clients 110 using samples of primary soundtrack audio received by clients 110 from a soundtrack playback system 125, as described in more detail below. System 100 may also receive secondary soundtracks associated with primary soundtracks from various users and store the user-provided soundtracks in database 120. Such users may be associated with the producer of a primary soundtrack and/or may be members of the general public.

Figure 2:
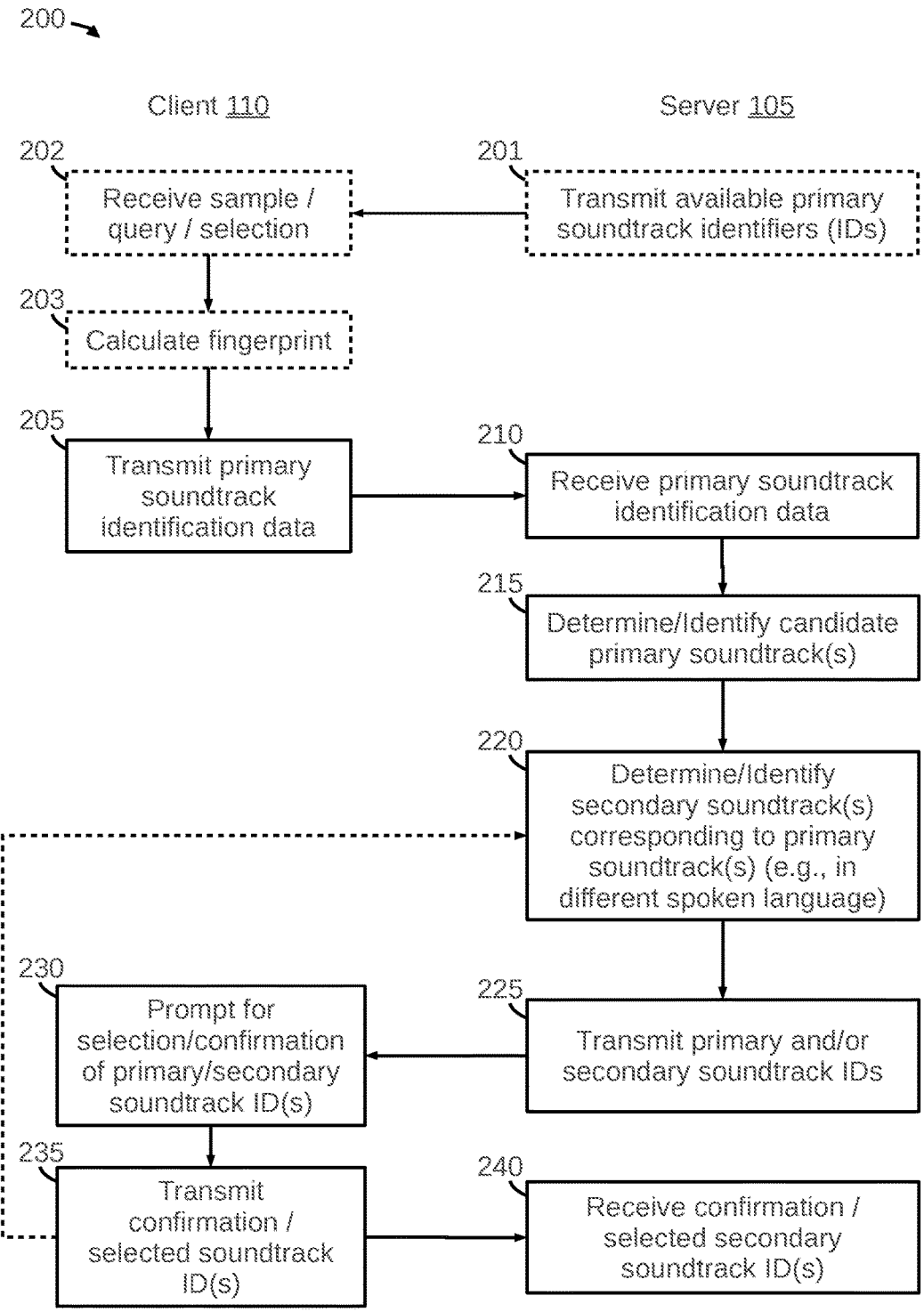
FIG. 2 is a flowchart of an exemplary method that may be executed to determine a secondary soundtrack to be provided to a client using the system shown in FIG. 1.

FIG. 2 is a flowchart of an exemplary method 200 that may be executed to determine a secondary soundtrack to be provided to a client 110 using system 100 (shown in FIG. 1). Referring to FIGS. 1 and 2, client 110 transmits 205 primary soundtrack identification data to server 105. Primary soundtrack identification data may include, for example, data representative of a primary soundtrack that is audible to client 110, a search query entered by a user of client 110, one or more locations (e.g., geographical location and/or network location) of client 110, and/or an identifier (ID) (e.g., title or name) of a soundtrack selected by a user of client 110.

In exemplary embodiments, client 110 receives 202 from a soundtrack playback system 125 (e.g., a movie theater speaker system or a television) a soundtrack identification sample of a primary soundtrack audible to client 110 (e.g., via an audio input device, such as a microphone), and determines the primary soundtrack based on the received soundtrack identification sample. For example, client 110 may transmit 205 the soundtrack identification sample to server 105 as the primary soundtrack identification data, and/or may calculate 203 an acoustic fingerprint of at least a portion of the soundtrack identification sample and transmit 205 the acoustic fingerprint as the primary soundtrack identification data. (In exemplary embodiments, an acoustic fingerprint represents characteristics of an audio sample, such as the intensity of tones at various frequencies over time.) In addition, or alternatively, client 110 may enable a user to enter one or more query terms, such as a full or partial soundtrack identifier and/or a soundtrack category (e.g., movie, television program, or live broadcast) and may transmit 205 the entered query terms to server 105 as the primary soundtrack identification data.

In some embodiments, a user of client 110 is able to select a primary soundtrack ID from a list of available soundtrack IDs. In such embodiments, server 105 transmits 201 a collection of available soundtrack IDs to client 110, and client 110 presents the available soundtrack IDs to the user for selection. When the user selects a soundtrack, the ID of the selected soundtrack is transmitted 205 to server 105 as the primary soundtrack identification data. Such embodiments enable the user to quickly select a primary soundtrack from a list of popular soundtracks, current soundtracks (e.g., associated with audiovisual works being broadcast or played in theaters), and/or any other collection of soundtracks. For example, if server 105 is operated by a movie theater, server 105 may transmit 201 a collection of soundtrack IDs associated with films currently being shown by the movie theater.

Server 105 receives 210 the primary soundtrack identification data from client 110 and, in response, determines or identifies 215 one or more candidate primary soundtracks based on the received soundtrack identification data. In exemplary embodiments, server 105 identifies 215 candidate primary soundtracks at least in part by selecting from database 120 any soundtracks that match the transmitted primary soundtrack identification data. For example, server 105 may select soundtracks that are associated with an acoustic fingerprint that matches an acoustic fingerprint provided by client 110, soundtracks that match query terms provided by client 110, soundtracks that match the location of client 110, and/or soundtracks that match a soundtrack ID provided by client 110.

Server 105 also determines 220 what soundtracks are associated with the primary soundtrack(s) to create a collection of one or more secondary soundtracks. In exemplary embodiments, soundtracks may be associated with each other within database 120 as alternative and/or as supplemental. For example, if the primary soundtrack is performed in a first spoken language, a corresponding soundtrack performed in a second spoken language may be associated with the primary soundtrack as an alternative soundtrack, and a director commentary in the first spoken language may be associated with the primary soundtrack as a supplemental soundtrack. A director commentary in the first spoken language may be associated with the primary soundtrack as a supplemental soundtrack or as both an alternative and supplemental soundtrack.

In exemplary embodiments, server 105 determines 220 the secondary soundtracks by selecting from database 120 the soundtracks that are associated with the candidate primary soundtrack as an alternative and/or supplemental soundtrack. Server 105 transmits 225 soundtrack metadata (e.g., IDs, titles, descriptions, and/or icons) associated with the secondary soundtracks to client 110. Client 110 prompts 230 the user of client 110 to select one or more of the secondary soundtracks. When a selection is made by the user, client 110 transmits 235 the ID(s) of the selected secondary soundtracks(s) to server 105, which receives 240 the transmitted secondary soundtrack IDs.

In some cases, server 105 may determine 215 that multiple soundtracks in database 120 match the primary soundtrack identification data and are therefore candidate primary soundtracks. For example, a query term, such as a partial title (e.g., "big"), may be associated with several soundtracks (e.g., "Big," "The Big Lebowski," and "Big Fish"). As another example, an acoustic fingerprint may be associated with multiple versions of a soundtrack, such as a theater version and an extended version.

In exemplary embodiments, when server 105 identifies 215 a plurality of candidate primary soundtracks, server 105 transmits 225 soundtrack metadata associated with the candidate primary soundtracks to client 110, which prompts 230 the user to select one of the candidate primary soundtracks. Client 110 transmits 235 the selected primary soundtrack ID to server 105, which identifies 220 secondary soundtracks and transmits 225 to client 110 the corresponding secondary soundtrack IDs, as described above. In addition, or alternatively, client 110 may prompt 230 the user to confirm the candidate primary soundtrack even when only one candidate primary soundtrack is determined 215 by server 105.

In some embodiments, when server 105 identifies 215 a plurality of candidate primary soundtracks, server 105 identifies 220 secondary soundtracks corresponding to each of the candidate primary soundtracks and transmits 225 both the primary and secondary soundtrack metadata to client 110, which prompts 230 the user to select the desired secondary soundtrack(s), as described above. For example, client 110 may present the soundtracks hierarchically by grouping secondary soundtracks with their corresponding candidate primary soundtrack.

Some embodiments enable a secondary soundtrack to be automatically selected based on a profile associated with the user. For example, a user profile, stored by database 120 and/or by client 110, may include a default spoken language. In such embodiments, client 110 may select, from the secondary soundtracks provided by server 105, one or more secondary soundtracks associated with the default spoken language, optionally prompting 230 the user to confirm the selection. In addition, or alternatively, server 105 may perform such a selection.

Figure 3:
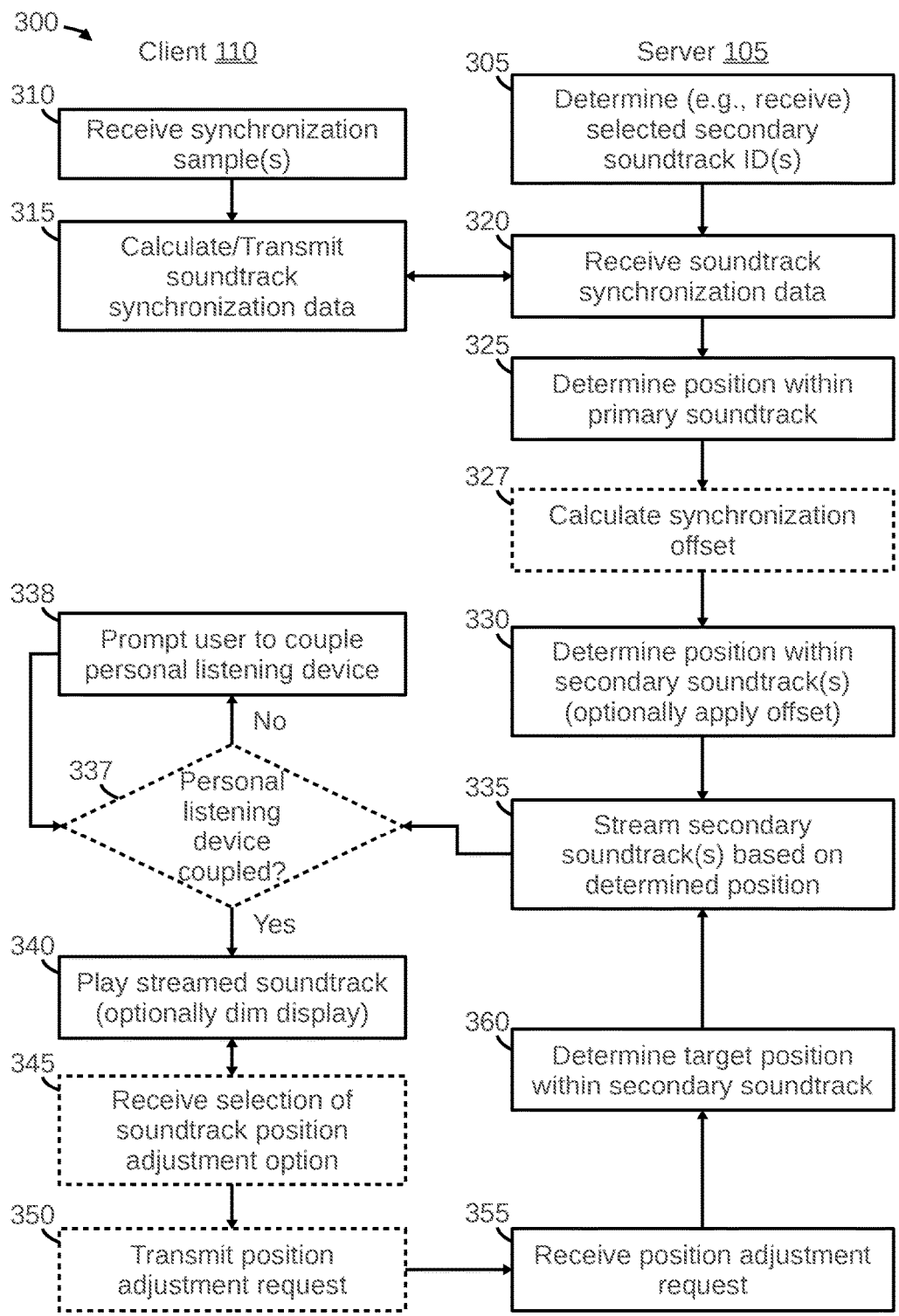
FIG. 3 is a flowchart of an exemplary method that may be executed to provide a secondary soundtrack to a client using the system shown in FIG. 1.

FIG. 3 is a flowchart of an exemplary method 300 that may be executed to provide a secondary soundtrack using system 100 (shown in FIG. 1). Referring to FIGS. 1 and 3, in exemplary embodiments server 105 determines 305 one or more secondary soundtrack IDs associated with a soundtrack to be provided to client 110. For example, server 105 may determine 305 the secondary soundtrack IDs by receiving 240 (shown in FIG. 2) one or more selected secondary soundtrack IDs from client 110.

In exemplary embodiments, client 110 receives 310 one or more synchronization samples of the primary soundtrack via a microphone. Client 110 transmits 315 soundtrack synchronization data (e.g., the synchronization sample(s) or an acoustic fingerprint calculated therefrom) to server 105. Server 105 receives 320 the soundtrack synchronization data and determines 325, based on the soundtrack synchronization data, a position within the primary soundtrack (e.g., a time or quantity of audio frames relative to the beginning of the primary soundtrack). In exemplary embodiments, the soundtrack synchronization data provided by client 110 includes one or more acoustic fingerprints (e.g., a single acoustic fingerprint or a sequence of acoustic fingerprints). Server 105 identifies within database 120 acoustic fingerprints that are associated with the primary soundtrack and match (e.g., are equal to, or within a predetermined tolerance of) the provided acoustic fingerprint or sequence of acoustic fingerprints. The position associated with the identified acoustic fingerprint(s) is determined 325 to be the position within the primary soundtrack that corresponds to the provided soundtrack synchronization data. Alternatively, the soundtrack synchronization data may include the synchronization sample(s) received 310 by client 110, in which case server 105 calculates one or more acoustic fingerprints based on the sample(s) and determines 325 the corresponding position as described above.

In some embodiments, soundtrack playback system 125 provides one or more synchronization signals to client 110 while playing a primary soundtrack. Such synchronization signals may be included in the soundtrack, for example, as audio signals that are imperceptible to viewers of the audiovisual work but can be identified by client 110, and/or as signals that are perceptible to viewer (e.g., during an introductory portion of the primary soundtrack). As one example, a synchronization signal may include a sequence of tones in a predetermined temporal pattern. In addition, or alternatively, soundtrack playback system 125 may transmit synchronization signals to client 110 as data packets over a network. For example, such synchronization signals may indicate the current position at which soundtrack playback system 125 is playing the primary soundtrack.

It is possible that multiple soundtracks may match the primary soundtrack identification data provided by client 110. In some embodiments, if server 105 identifies multiple acoustic fingerprints that match the provided soundtrack synchronization data, server 105 selects from the matching acoustic fingerprints that which is associated with the earliest position within the primary soundtrack to determine 325 the position within the primary soundtrack. Such embodiments facilitate resolving ambiguity in favor of the most probable scenario (e.g., a user requesting a secondary soundtrack as the audiovisual work begins). In other embodiments, when multiple matches are found, server 105 requests that client 110 submit additional soundtrack synchronization data. When client 110 transmits 315 the additional soundtrack synchronization data, server 105 again attempts to determine 325 the position within the primary soundtrack, as described above. In yet other embodiments, client 110 may prompt the user to select a position from the positions that correspond to the matching acoustic fingerprints.

Server 105 determines 330 a target position within the secondary soundtrack(s) based on the position within the primary soundtrack that was previously determined 325. For example, the target secondary soundtrack position may be equal to the primary soundtrack position. Alternatively, server 105 may determine the target position based on both the determined position and a synchronization offset. For example, server 105 may add a predetermined synchronization offset (e.g., expressed in milliseconds, seconds, or audio frames) to the determined position to determine 330 the target position. Such embodiments facilitate advancing the target position to account for estimated delays in communication and/or processing within system 100.

Further, in some embodiments, server 105 calculates 327 the synchronization offset based on a communication latency between server 105 and client 110, a computational latency associated with client 110, and/or a computational latency associated with server 105. For example, server 105 may calculate the latency between receipt 320 of the soundtrack synchronization data and determination 330 of the target position within the secondary soundtrack. In addition, or alternatively, client 110 may provide (e.g., in transmission 315) the time at which the synchronization sample was received 310, and server 110 may calculate the latency between receipt 310 of the sample by client 110 and receipt 320 of the synchronization data by server 105. Such latency values represent delays that have occurred in preparing to provide the secondary soundtrack(s) to client 110. In addition, when calculating 327 the synchronization offset, server 105 may include in the offset an estimated latency (e.g., communication latency) that is predicted to occur prior to playback of the secondary soundtrack(s) by client 110. For example, server 105 may measure the communication latency between server 105 and client 110 during prior communication (e.g., transmission 315 and receipt 320 of the soundtrack synchronization data).

Server 105 streams 335 the selected secondary soundtrack(s) to client 110 based on the target position determined 330 by server 105. For example, server 105 may transmit the soundtrack to client 110 beginning at the target position. If multiple secondary soundtracks are selected, server 105 may combine (e.g., mix and/or multiplex) the selected secondary soundtracks and stream 335 the combined soundtrack.

Client 110 plays 340 the soundtrack that is streamed 335 based on the determined target position, such that the user can hear the selected secondary soundtrack(s) instead of, or in addition to, the primary soundtrack. Client 110 optionally adjusts a brightness of (e.g., dims) the display of client 110, enabling the user to enjoy the secondary soundtrack(s) without distracting other viewers. Further, client 110 may determine 337 whether a personal listening device (e.g., earphone or headphone) is coupled in communication with client 110 and play 340 the streamed soundtrack only when a personal listening device is so connected. Otherwise, client 110 may prompt 338 the user to couple a personal listening device to client 110 and, when this is complete, continue to play 340 the soundtrack. Such embodiments further facilitate reducing distraction of other viewers when the user listens to the streamed soundtrack.

Exemplary embodiments enable the user to finely adjust synchronization of the streamed soundtrack to the audiovisual work. In some embodiments, client 110 receives 345 a selection of a soundtrack position adjustment option selected by the user. For example, while playing 340 the soundtrack, client 110 may display one or more position adjustment icons corresponding to one or more offsets (e.g., 0.1 seconds, 0.5 seconds, 1.0 second, and/or 3.0 seconds) in a forward and/or backward direction.

Client 110 plays 340 the soundtrack based on the selected position adjustment. For example, as the soundtrack is streamed 335, client 110 may store a portion of the soundtrack in a buffer, allowing the soundtrack to be played continuously from the buffer despite occasional interruptions in communication between server 105 and client 110. If the portion of the soundtrack that corresponds to the current position plus the offset indicated by the position adjustment is stored in the buffer, client 110 may immediately play 340 that portion of the soundtrack.

In addition, or alternatively, client 110 transmits 350 a position adjustment request to server 105 specifying the offset. Server 105 receives 355 the position adjustment request and determines (e.g., calculates) 360 a target position within the secondary soundtrack(s) based on the current position within the secondary soundtrack(s) and the specified offset. For example, server 105 may advance the current position by the specified offset. Server 105 proceeds to stream 335 the secondary soundtrack(s) based on the new target position, and client 110 plays 340 the streamed soundtrack, as described above.

Figure 4:
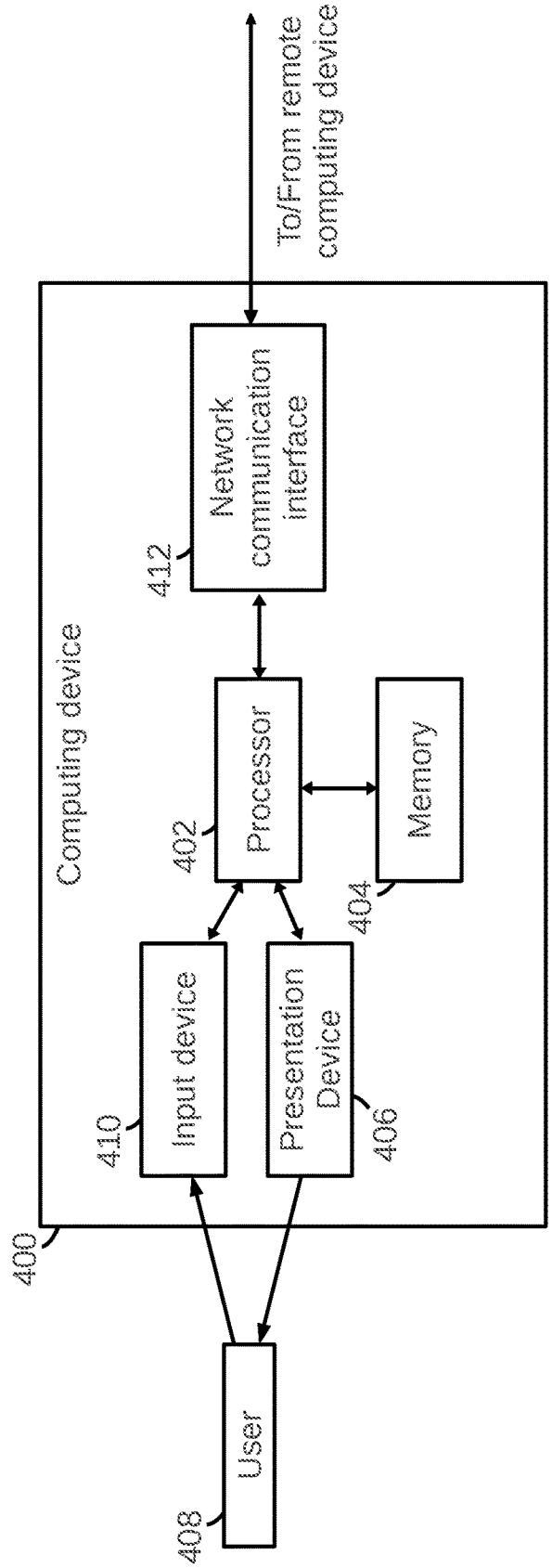
FIG. 4 is a block diagram of an exemplary computing device.

Embodiments described herein may be implemented using one or more computing devices. FIG. 4 is a block diagram of an exemplary computing device 400. Computing device 400 includes a processor 402 for executing instructions. In some embodiments, executable instructions are stored in a memory 404. Memory 404 is any device allowing information, such as executable instructions, soundtracks, soundtrack data (e.g., identifiers, descriptions, acoustic fingerprints, associations between soundtracks, etc.), user data (e.g., a default spoken language), and/or other data, to be stored and retrieved. For example, memory 404 may include one or more random access memory (RAM) modules, flash memory modules, hard disks, solid state disks, and/or optical disks.

Computing device 400 may also include at least one presentation device 406 for presenting information to a user 408. Presentation device 406 is any component capable of conveying information to user 408. Presentation device 406 may include, without limitation, a display device (e.g., a liquid crystal display (LCD), organic light emitting diode (OLED) display, or "electronic ink" display) and/or an audio output device (e.g., a speaker or headphones). In some embodiments, presentation device 406 includes an output adapter, such as a video adapter and/or an audio adapter. An output adapter is operatively coupled to processor 402 and configured to be operatively coupled to an output device, such as a display device or an audio output device.

The computing device 400 may include an input device 410 for receiving input from user 408. Input device 410 may include, for example, a keyboard, a pointing device, a mouse, a stylus, a touch sensitive panel (e.g., a touchpad or a touch screen), a gyroscope, an accelerometer, a position detector, and/or an audio input device (e.g., a microphone). A single component, such as a touch screen, may function as both an output device of presentation device 406 and input device 410.

Computing device 400 also includes a network communication interface 412, which enables computing device 400 to communicate with a remote device (e.g., another computing device 400) via a communication medium, such as a wired or wireless packet network. For example, computing device 400 may transmit and/or receive data via network communication interface 412.

In exemplary embodiments, memory 404 stores computer-executable instructions for performing one or more of the operations described herein. Memory 404 may include one or more non-transitory computer-readable storage media that have computer-executable components embodied thereon. When executed by a computing device 400 (e.g., by processor 402), such computer-executable instructions cause the computing device 400 to perform one or more of the described operations.

Exemplary Operating Environment

The operations described herein may be performed by a computer or computing device. A computer or computing device may include one or more processors or processing units, system memory, and some form of computer-readable storage media. Exemplary computer-readable storage media include flash memory drives, digital versatile discs (DVDs), compact discs (CDs), floppy disks, and tape cassettes. Computer-readable storage media are tangible and non-transitory devices that store information such as computer readable instructions, data structures, program modules, or other data.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The operations illustrated and described herein may be implemented as software instructions encoded on a computer-readable medium, in hardware programmed or designed to perform the operations, or both. For example, aspects of the disclosure may be implemented as a system on a chip. Aspects of the disclosure transform a general-purpose computer into a special-purpose computing device when programmed to execute the instructions described herein.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. One or more non-transitory computer-readable media having embodied thereon computer-executable instructions, wherein when executed by a computing device, the computer-executable instructions cause the computing device to:
    transmit a primary soundtrack to a remote computing device, wherein the primary soundtrack includes a primary soundtrack identification data and is associated with a first spoken language, and wherein the primary soundtrack identification data includes one or more locations;
    match, by the remote computing device, the one or more locations of a plurality of stored soundtracks associated with the one or more locations;
    identify, by the remote computing device, at least one candidate primary soundtrack based on the match of the one or more locations to the plurality of stored soundtracks, wherein each of the at least one candidate primary soundtrack is associated with at least one secondary soundtrack, and wherein the at least one secondary soundtrack is associated with a second spoken language and is a translation of the first spoken language;
    transmit, by the remote computing device, the at least one candidate primary soundtrack to the computing device;
    receive a selection from a user of the computing device of one of the at least one candidate primary soundtrack, wherein the selection is associated to one of the at least one secondary soundtrack;
    transmit the selection to the remote computing device;
    receive, via a microphone of the computing device, a plurality of audio signals of the primary soundtrack;
    calculate an acoustic fingerprint of the primary soundtrack based on the received plurality of audio signals;
    transmit the calculated acoustic fingerprint to the remote computing device, wherein the remote computing device is configured to determine a position in the primary soundtrack based on the acoustic fingerprint, determine a corresponding position in the selection based on the determined position in the primary soundtrack, and determine a corresponding position in the secondary soundtrack based on the determined position in the selection;
    receive a stream of the secondary soundtrack based on the determined position;
    determine whether an earphone or headphone is coupled in communication with the computing device;
    upon determining that an earphone or headphone is not coupled in communication with the computing device, prompt a user to couple the earphone or the headphone to the computing device; and
    upon determining that an earphone or headphone is coupled in communication with the computing device, play the secondary soundtrack through the earphone or headphone based on the corresponding position in the secondary soundtrack.

2. The computer-readable media of claim 1, wherein the computer-executable instructions further cause the computing device to transmit a location of the computing device to a the remote computing device, such that the primary soundtrack is determined from one or more candidate primary soundtracks that match the transmitted location of the computing device.

3. The computer-readable media of claim 1, wherein the computer-executable instructions cause the computing device to:
    generate a soundtrack identification sample of the primary soundtrack based on the plurality of audio signals; and
    determine the primary soundtrack based on the soundtrack identification sample.

4. The computer-readable media of claim 3, wherein the computer-executable instructions cause the computing device to:
    calculate an acoustic fingerprint of at least a portion of the soundtrack identification sample;
    transmit the acoustic fingerprint to the remote computing device; and
    receive, in response to the transmitted acoustic fingerprint, an identifier of the primary soundtrack from the remote computing device.

5. The computer-readable media of claim 1, wherein the computer-executable instructions further cause the computing device to decrease a brightness of a display of the computing device while the secondary soundtrack is played.

6. The computer-readable media of claim 1, wherein the computer-executable instructions further cause the computing device to:
    calculate a target position within the secondary soundtrack based on a current position within the secondary soundtrack and a soundtrack position adjustment option when the soundtrack position adjustment option is selected by the user of the computing device, the soundtrack position adjustment option configured to directly adjust the position of the secondary soundtrack; and
    play the secondary soundtrack based on the calculated target position.

7. A method comprising:
  transmitting a primary soundtrack to a remote computing device, wherein the primary soundtrack includes a primary soundtrack identification data and is associated with a first spoken language, and wherein the primary soundtrack identification data includes one or more locations;
  matching, by the remote computing device, the one or more locations a plurality of stored soundtracks associated with the one or more locations;
  identifying, by the remote computing device, at least one candidate primary soundtrack based on the match of the one or more locations to the plurality of stored soundtracks, wherein each of the at least one candidate primary soundtrack is associated with at least one secondary soundtrack, and wherein the at least one secondary soundtrack is associated with a second spoken language and is a translation of the first spoken language;
  transmitting, by the remote computing device, the at least one candidate primary soundtrack to a computing device;
  receiving, at a computing device, a selection from a user of the computing device of one of the at least one candidate primary soundtrack, wherein the selection is associated to one of the at least one secondary soundtrack;
  transmitting the selection to the remote computing device;
  receiving, via a microphone of the computing device, a plurality of audio signals of the primary soundtrack;
  calculating an acoustic fingerprint of the primary soundtrack based on the received plurality of audio signals;
  transmitting the calculated acoustic footprint fingerprint to the remote computing device, wherein the remote computing device is configured to determine a position within the primary soundtrack based on the acoustic fingerprint and determine a corresponding position in the selection based on the determined position in the primary soundtrack, and determine a corresponding position in the secondary soundtrack based on the determined position in the selection;
  receiving a stream of the secondary soundtrack based on the determined position;
  calculating a synchronization offset based on a computational latency associated with the computing device;
  determining whether an earphone or headphone is coupled in communication with the computing device; and
  upon determining that an earphone or headphone is coupled in communication with the computing device, playing the secondary soundtrack to the user based on the determined corresponding position and the synchronization offset.

8. The method of claim 7, further comprising:
  generating a soundtrack identification sample of the primary soundtrack based on the received plurality of audio signals;
  determining a candidate primary soundtrack based on the received soundtrack identification sample;
  displaying an identifier of the candidate primary soundtrack to the user; and
  displaying to the user one or more secondary soundtrack identifiers, each secondary soundtrack identifier corresponding to a plurality of secondary soundtracks associated with the candidate primary soundtrack, wherein receiving a selection comprises receiving from the user a selection of one of the displayed secondary soundtrack identifiers.

9. The method of claim 8, wherein determining a candidate primary soundtrack comprises determining a plurality of candidate primary soundtracks, and wherein displaying an identifier of the candidate primary soundtrack comprises displaying a plurality of primary soundtrack identifiers corresponding to the plurality of candidate primary soundtracks.

10. The method of claim 9, further comprising displaying to the user a plurality of candidate primary soundtrack identifiers corresponding to the plurality of candidate primary soundtracks, and receiving, from the user, a selection of one of the primary soundtrack identifiers, wherein displaying one or more secondary soundtrack identifiers comprises displaying one or more secondary soundtrack identifiers that are associated with the selection of one of the displayed primary soundtrack identifiers.

11. The method of claim 7, further comprising:
  receiving, from the user, a soundtrack position adjustment request of the secondary soundtrack;
  calculating a target position within the selected secondary soundtrack based on a current position within the selected secondary soundtrack and the received soundtrack position adjustment request; and
  playing the secondary soundtrack associated with the selection to the user based on the calculated target position.

12. A system for providing a soundtrack to a user, said system comprising:
  a memory device for storing a primary soundtrack and a secondary soundtrack, wherein the primary soundtrack is associated with a first spoken language, and wherein the secondary soundtrack is associated with a second spoken language and is a translation of the primary soundtrack;
  a microphone;
  a media output component; and
  a processor coupled to said memory device and programmed to:
    transmit a primary soundtrack to a remote computing device, wherein the primary soundtrack includes a primary soundtrack identification data and is associated with a first spoken language, and wherein the primary soundtrack identification data includes one or more locations;
    match, by the remote computing device, the one or more locations of a plurality of stored soundtracks associated with the one or more locations;
    identify, by the remote computing device, at least one candidate primary soundtrack based on the match of the one or more locations to the plurality of stored soundtracks, wherein each of the at least one candidate primary soundtrack is associated with at least one secondary soundtrack, and wherein the at least one secondary soundtrack is associated with a second spoken language and is a translation of the first spoken language;
    transmit, by the remote computing device, the at least one candidate primary soundtrack to a computing device;
    receive a selection from a user of one of the at least one candidate primary soundtrack, wherein the selection is associated to one of the at least one secondary soundtrack;
    transmit the selection to the remote computing device;

receive, via the microphone, a plurality of audio signals of the primary soundtrack;

calculate an acoustic fingerprint of the primary soundtrack based on the received plurality of audio signals;

transmit the calculated acoustic fingerprint to the remote computing device, wherein the remote computing device is configured to determine a position within the primary soundtrack based on the acoustic fingerprint, calculate a synchronization offset based on a computational latency associated with the system, determine a corresponding position in the selection based on the determined position in the primary soundtrack, and determine a corresponding position in the secondary soundtrack based on the determined position in the selection;

receive a stream of the secondary soundtrack based on the determined position;

determine whether an earphone or headphone is coupled in communication with the media output component; and upon determining that an earphone or headphone is coupled in communication with the media output component, play the secondary soundtrack associated with the selection to the user based on the corresponding position and the synchronization offset.

13. The system of claim 12, wherein said processor is programmed to:

generate a soundtrack identification sample of the primary soundtrack based on the plurality of audio signals; and determine the primary soundtrack based on soundtrack identification sample.

14. The system of claim 13, wherein said processor is programmed to select one secondary soundtrack of the one or more secondary soundtracks at least in part by:

calculate an acoustic fingerprint of at least a portion of the soundtrack identification sample;

transmit, to the remote computing device, the acoustic fingerprint; and receive, in response to the transmitted acoustic fingerprint, an identifier of the primary soundtrack from the remote computing device.

15. The computer-readable media of claim 1, wherein the computer-executable instructions further cause the computing device to:

receive a determination of one or more primary soundtrack candidates;

receive a user selection of the one or more primary soundtrack candidates, the selection being the primary soundtrack;

determine one or more secondary soundtrack candidates; and receive a user selection of the one or more secondary soundtrack candidates, the selection being the secondary soundtrack.

16. The computer-readable media of claim 1, wherein the remote computing device is further configured to determine a plurality of potential positions in the primary soundtrack based on the calculated acoustic fingerprint.

17. The computer-readable media of claim 16, wherein the remote computing device is further configured to select the position in the primary soundtrack based on a previous position in the primary soundtrack and the plurality of potential positions in the primary soundtrack.

18. The computer-readable media of claim 16, wherein the remote computing device is further configured to:

transmit a request to the computing device for additional synchronization data;

receive the additional synchronization data from the computing device; and determine the position in the primary soundtrack based on the additional synchronization data and the plurality of potential positions in the primary soundtrack.

19. The computer-readable media of claim 1, wherein the remote computing device is further configured to determine an additional secondary soundtrack;

determine a position in the additional secondary soundtrack based on the determined position in the primary soundtrack; and combine the secondary soundtrack and the additional secondary soundtrack into a single stream to transmit to the computing device.

* * * * *